United States Patent
Shigeeda et al.

(10) Patent No.: US 8,755,307 B2
(45) Date of Patent: Jun. 17, 2014

(54) IP-ADDRESS DISTRIBUTION DEVICE AND IP-ADDRESS DISTRIBUTION METHOD

(75) Inventors: Tetsuya Shigeeda, Tokyo (JP); Hiroyuki Ohata, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 21 days.

(21) Appl. No.: 13/146,769

(22) PCT Filed: Jan. 20, 2010

(86) PCT No.: PCT/JP2010/050646
§ 371 (c)(1),
(2), (4) Date: Jul. 28, 2011

(87) PCT Pub. No.: WO2010/087259
PCT Pub. Date: Aug. 5, 2010

(65) Prior Publication Data
US 2011/0280158 A1  Nov. 17, 2011

(30) Foreign Application Priority Data
Jan. 28, 2009  (JP) ................................. 2009-017031

(51) Int. Cl.
*H04L 12/28* (2006.01)

(52) U.S. Cl.
USPC ........................................................ 370/255

(58) Field of Classification Search
USPC .................................. 370/254, 255, 389, 218
See application file for complete search history.

(56) References Cited

U.S. PATENT DOCUMENTS

| 6,493,767 B1 | 12/2002 | Ishida et al. |
| 6,982,953 B1 * | 1/2006 | Swales .......................... 370/218 |
| 7,483,396 B2 | 1/2009 | Steindl |

FOREIGN PATENT DOCUMENTS

| CN | 1564538 A | 1/2005 |
| CN | 1645867 A | 7/2005 |
| CN | 1713629 A | 12/2005 |
| JP | 09-200262 A | 7/1997 |
| JP | 2003-348090 A | 12/2003 |
| JP | 2004-503150 A | 1/2004 |
| JP | 2004-038242 A | 2/2004 |
| JP | 2006-352572 A | 12/2006 |
| JP | 2007-174401 A | 7/2007 |
| JP | 2007-174404 | 7/2007 |
| WO | 02/05107 A1 | 1/2002 |
| WO | WO 2008/120363 A1 | 10/2008 |

OTHER PUBLICATIONS

Office Action (Notice of Rejection) from Japanese Patent Office issued in corresponding Japanese Patent Application No. 2010-548472 dated Mar. 29, 2011, with an English translation thereof.

(Continued)

*Primary Examiner* — Man Phan
*Assistant Examiner* — Kevin Lee
(74) *Attorney, Agent, or Firm* — Buchanan Ingersoll & Rooney PC

(57) ABSTRACT

A path-information obtaining unit obtains a piece of path information of a communication network by inquiring a port number of an Ethernet switch that transmits a MAC address of a request source of an IP address. An IP-address specifying unit specifies an IP address that corresponds to the piece of path information of the communication network by referring to an IP-address correspondence table, and distributes the specified IP address to the request source of an IP address.

4 Claims, 8 Drawing Sheets

(56) References Cited

OTHER PUBLICATIONS

Notice of Allowance (Decision of a Patent Grant) from Japanese Patent Office issued in corresponding Japanese Patent Application No. 2010-548472 dated Jun. 21, 2011, with an English translation thereof.

Comer, "Internetworking with TCP/IP: Principles, Protocols, and Architecture," Aug. 2008, vol. 1, 4th Edition, Chapter 6 (23), pp. 377-381, Kyoritsu Shuppan, Japan, with English translation thereof.

International Search Report (PCT/ISA/210) issued on Mar. 23, 2010, by Japanese Patent Office as the International Searching Authority for International Application No. PCT/JP2010/050646.

Written Opinion (PCT/ISA/237) issued on Mar. 23, 2010, by Japanese Patent Office as the International Searching Authority for International Application No. PCT/JP2010/050646.

D. Comer, Internetworking with TCP/IP, vol. I, 4th Edition, Aug. 2008, Kyoritsu Shuppan (4 pages In Japanese).

Office Action from Chinese Patent Office dated Aug. 2, 2013, issued in corresponding Chinese Patent Application No. 201080005696.7, with English translation thereof. (9 pages).

Office Action from Chinese Patent Office dated Mar. 5, 2014, issued in corresponding Chinese Patent Application No. 20108005696.7, with English translation thereof. (6 pages).

\* cited by examiner

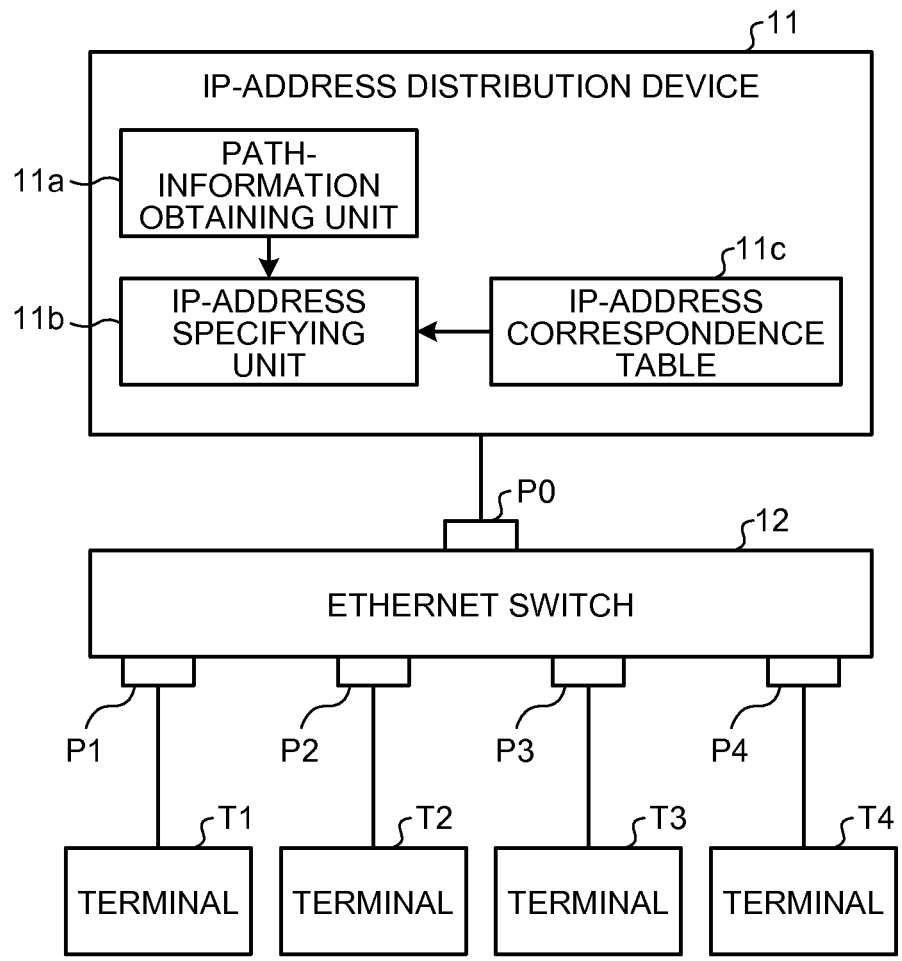

| PORT NUMBER OF ETHERNET SWITCH 13 | | IP ADDRESS |
|---|---|---|
| 1 | PORT NUMBER OF ETHERNET SWITCH 12 | |
| | 1 | 192. 168. 1. 1 |
| | 2 | 192. 168. 1. 2 |
| | 3 | 192. 168. 1. 3 |
| | 4 | 192. 168. 1. 4 |
| 2 | | 192. 168. 1. 11 |
| 3 | | 192. 168. 1. 21 |
| 4 | | 192. 168. 1. 31 |

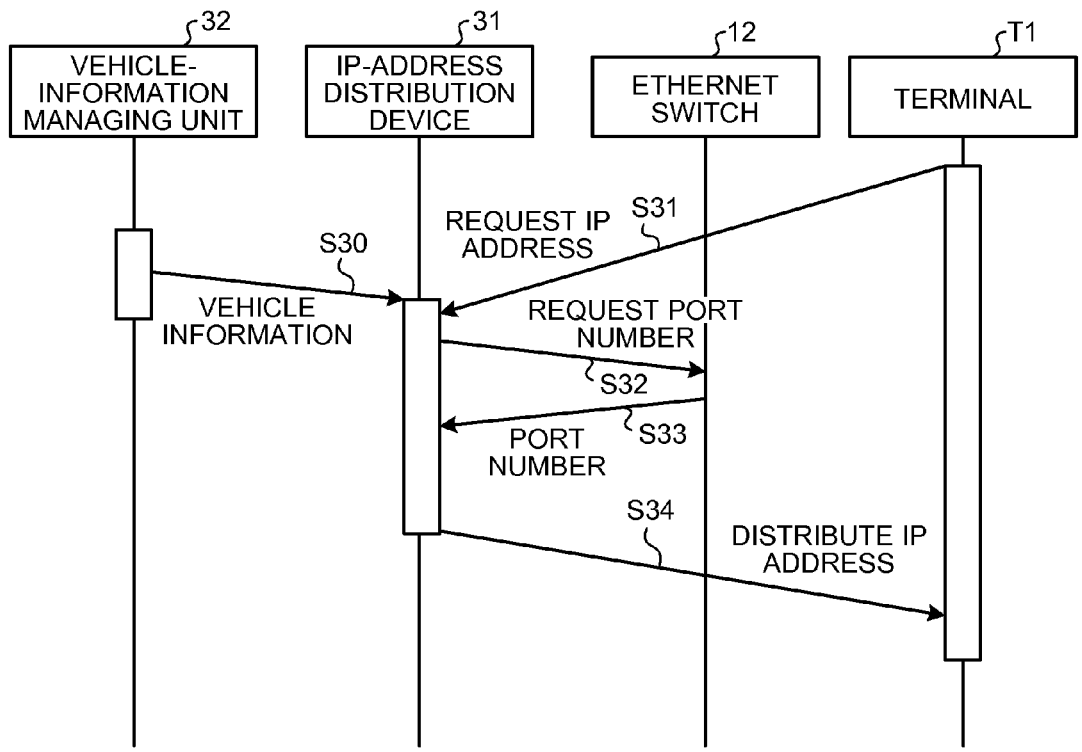

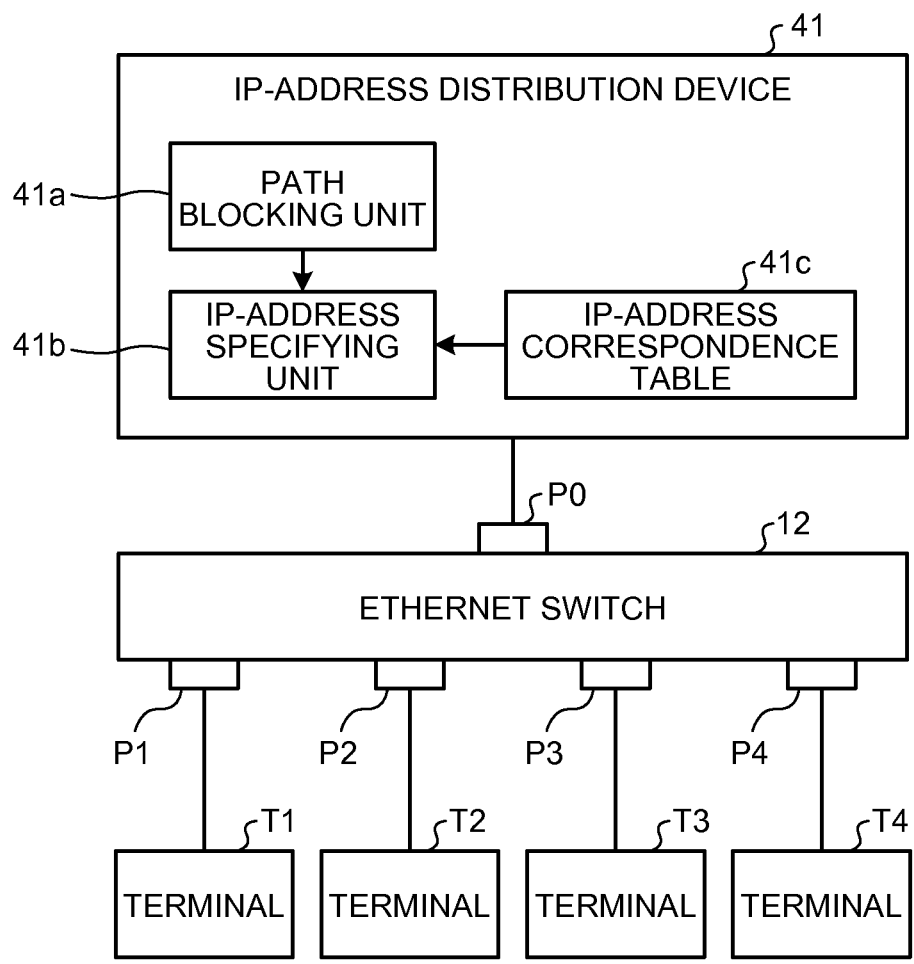

IP-ADDRESS DISTRIBUTION DEVICE AND IP-ADDRESS DISTRIBUTION METHOD

FIELD

The present invention relates to an IP-address distribution device and an IP-address distribution method, more specifically, to a method for distributing an IP address that is specified corresponding to a network path.

BACKGROUND

TCP/IP has been known as a communication protocol on Ethernet (registered trademark). In the TCP/IP, an IP address is used as information for identifying a terminal on Ethernet, and this IP address is uniquely allocated to each terminal. As a method for uniquely allocating an IP address, there is a method for giving an IP address to a terminal while avoiding duplication, recording this IP address in a recording device within the terminal, and reading out the recorded IP address at a time of activation.

As a method for determining an IP address of a terminal itself, there is a method of using a reverse address resolution protocol (RARP). The RARP is a protocol for inquiring an IP address that corresponds to a MAC address (a physical address on Ethernet) of the terminal itself. According to the RARP, when a MAC address of the terminal itself is broadcasted, a RARP server on a network responds the IP address. The RARP is effective for inquiring an IP address when a device that does not have an external storage device is connected to a network.

In the RARP, a BOOTP (BOOTstrap Protocol) and a DHCP (Dynamic Host Configuration Protocol) are also used in some cases to deal with a problem in that only IP addresses of which a corresponding MAC address is registered in advance to the RARP server can be handled (Non Patent Literature 1).

CITATION LIST

Non Patent Literature

Non Patent Literature 1: Douglas E. Corner, 'Internetworking with TCP/IP', Vol. 1, 4th Edition, August 2008, KYORITSU SHUPPAN

SUMMARY

Technical Problem

However, according to the conventional technique mentioned above, an IP address is allocated depending on a MAC address unique to a terminal that requests an IP address, without depending on a wiring path of a communication network. Therefore, after an IP address X is allocated to a terminal A that is connected to a certain specific position on the communication network, an IP address Y different from the IP address X can be also allocated to the terminal A when the terminal A that is connected to the same position on the communication network requests an IP address again. Consequently, this has a problem of generating a trouble in operating the terminal A.

The present invention has been achieved in view of the above problems, and an object of the present invention is to obtain an IP-address distribution device and an IP-address distribution method capable of distributing an IP address by relating the IP address to a physical wiring path on a network.

Solution to Problem

An IP-address distribution device according to an aspect of the present invention including: a path-information obtaining unit that obtains a piece of path information indicating a physical connection configuration of a communication network that reaches a terminal as a request source of an IP address; and an IP-address specifying unit that specifies an IP address to be distributed to the request source based on a piece of path information of the communication network.

Advantageous Effects of Invention

According to the present invention, it is possible to distribute an IP address by relating the IP address to a physical wiring path on a network.

BRIEF DESCRIPTION OF DRAWINGS

FIG. 1 is a block diagram of a schematic configuration of a system to which an IP-address distribution device 11 according to a first embodiment of the present invention is applied.

FIG. 2 is an example of contents of an IP-address correspondence table 11c in FIG. 1.

FIG. 8 is an example of contents of an IP-address correspondence table 31c in FIG. 7.

FIG. 9 depicts an operation at the time of distribution of an IP address by the IP-address distribution device 31 in FIG. 7.

FIG. 10 is a block diagram of a schematic configuration of a system to which an IP-address distribution device 41 according to a third embodiment of the present invention is applied.

DESCRIPTION OF EMBODIMENTS

Figure 3:
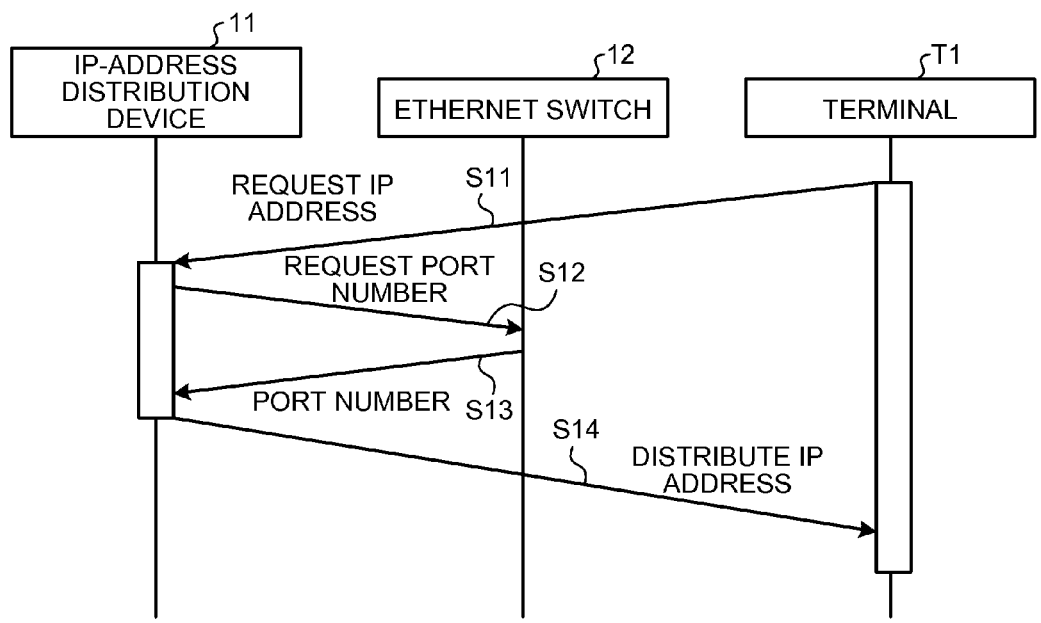
FIG. 3 depicts an operation at the time of distribution of an IP address by the IP-address distribution device 11 in FIG. 1.

Exemplary embodiments of an IP-address distribution device according to the present invention will be explained below in detail with reference to the accompanying drawings. The present invention is not limited to the embodiments.

First Embodiment

FIG. 1 is a block diagram of a schematic configuration of a system to which an IP-address distribution device 11 according to a first embodiment of the present invention is applied. In FIG. 1, the IP-address distribution device 11, an Ethernet switch 12, and terminals T1 to T4 are provided on a communication network, and the IP-address distribution device 11 is connected to the terminals T1 to T4 via the Ethernet switch 12. Ethernet can be used as the communication network, for example.

The IP-address distribution device 11 is connected to a port P0 of the Ethernet switch 12, and the terminals T1 to T4 are connected to ports P1 to P4 of the Ethernet switch 12, respectively, thereby establishing a wiring path of the communication network. The Ethernet switch 12 can operate as a switching hub on Ethernet, and can determine which MAC address passes which one of the ports P0 to P4.

A path-information obtaining unit 11a, an IP-address specifying unit 11b, and an IP-address correspondence table 11c are provided in the IP-address distribution device 11. The path-information obtaining unit 11a can obtain path information of the communication network that reaches a request source of an IP address. For example, the path-information obtaining unit 11a can obtain path information of the communication network by inquiring a port number of the Ethernet switch 12 that transmits a MAC address of the request source of an IP address. The IP-address specifying unit 11b can specify an IP address to be distributed to the request source of an IP address, based on the path information of the communication network. Correspondence relationships between path information of the communication network and IP addresses can be registered in the IP-address correspondence table 11c.

FIG. 2 is an example of contents of the IP-address correspondence table 11c in FIG. 1. In FIG. 2, when port numbers of the ports P1 to P4 of the Ethernet switch 12 are 1 to 4, respectively, mutually different IP addresses are registered corresponding to the port numbers 1 to 4, in the IP-address correspondence table 11c.

An IP address of "192.168.1.1" can be allocated to the terminal T1 connected to the port P1 of the port number 1, at the request of the terminal T1. An IP address of "192.168.1.2" can be allocated to the terminal T2 connected to the port P2 of the port number 2, at the request of the terminal T2. An IP address of "192.168.1.3" can be allocated to the terminal T3 connected to the port P3 of the port number 3, at the request of the terminal T3. An IP address of "192.168.1.4" can be allocated to the terminal T4 connected to the port P4 of the port number 4, at the request of the terminal T4.

FIG. 3 depicts an operation at the time of distribution of an IP address by the IP-address distribution device 11 in FIG. 1. In FIG. 3, when there is an IP address request from the terminal T1 in FIG. 1, for example (S11), this IP address request is transmitted to the IP-address distribution device 11 via the Ethernet switch 12. In this IP address request, an IP-address request message is transmitted by broadcast. A broadcast address is set in a distribution destination address of this IP-address request message. A MAC address of the terminal T1 is set in a distribution source address.

When the IP-address distribution device 11 receives the IP address request from the terminal T1, the path-information obtaining unit 11a extracts a MAC address from this IP address request. An inquiry about which one of the ports P1 to P4 receives this MAC address is transmitted to the Ethernet switch 12 (S12). The Ethernet switch 12 determines which one of the ports P1 to P4 receives this MAC address. When the port P1 receives the MAC address, the Ethernet switch 12 returns to the IP-address distribution device 11 an indication that the port P1 receives this MAC address (S13).

When the indication that the port P1 receives this MAC address is returned to the IP-address distribution device 11, the IP-address specifying unit 11b specifies an IP address that corresponds to the port number 1 of the port P1, by referring to the IP-address correspondence table 11c.

When the IP address that corresponds to the port number 1 of the port P1 is specified, this IP address is distributed to the terminal T1 of the request source of the IP address (S14).

According to this distribution of an IP address, an IP-address distribution message is transmitted by unicast. A MAC address of the terminal T1 is set in the distribution destination address of this IP-address distribution message, and a MAC address of the IP-address distribution device 11 is set in the distribution source address. When the IP-address distribution device 11 distributes an IP address, information about to which terminal of which MAC address of which port this IP address is distributed is stored.

When the terminal T1 receives the IP address transmitted from the IP-address distribution device 11, this IP address is set as the IP address of the terminal T1. As a result, communications with the terminal T1 become possible by using this IP address.

When the IP-address distribution device 11 receives again an IP address request via the port P1 of the Ethernet switch 12 after the IP address corresponding to the port number 1 of the port P1 is distributed, it is determined whether a MAC address of a distribution source included in the IP address request of this time is the same as a MAC address of a distribution source to which the IP address is already distributed.

When the MAC address of the distribution source included in the IP address request of this time is the same as the MAC address of the distribution source to which the IP address is already distributed, the IP address that is already distributed is distributed to the request source of an IP address of this time. For example, when the terminal T1 requests an IP address again in a state that the terminal T1 is connected to the port P1 of the Ethernet switch 12 after the IP address of "192.168.1.1" is distributed to the terminal T1 in response to the IP address request from the terminal T1, the IP address of "192.168.1.1" is distributed to the terminal T1 again.

On the other hand, when the MAC address of the distribution source included in the IP address request of this time is different from the MAC address of the distribution source to which the IP address is already distributed, the IP address different from the IP address that is already distributed is specified, and this IP address is distributed to the IP address request source of this time. For example, assume that a terminal T5 instead of the terminal T1 is connected to the port P1 of the Ethernet switch 12 after the IP address of "192.168.1.1" is distributed to the terminal T1 in response to the IP address request from the terminal T1. When the terminal T5 requests an IP address via the port P1 of the Ethernet switch 12, an IP address of "192.168.1.5" is distributed to the terminal T5, for example.

With this arrangement, the IP address of "192.168.1.1" can be allocated to the terminal T1 in a fixed manner even when the IP address that is allocated to the terminal T1 is set again after the IP address of "192.168.1.1" is allocated to the terminal T1 that is connected to the port P1 of the Ethernet switch 12. Therefore, it is possible to prevent allocation of an IP address different from an IP address that is allocated last time to the terminal T1 that is connected to the port P1 of the Ethernet switch 12. Consequently, the terminal T1 can be efficiently operated on a fixed communication network.

The IP-address distribution device 11 can be used in place of a DHCP server, and the terminals T1 to T4 can be operated as DHCP clients.

IP addresses that correspond to a part of the ports P1 to P4 of the Ethernet switch 12 can be registered in the IP-address correspondence table 11c, and protocols of a DHCP or the like can be used for the rest of the ports P1 to P4.

Second Embodiment

Figure 4:
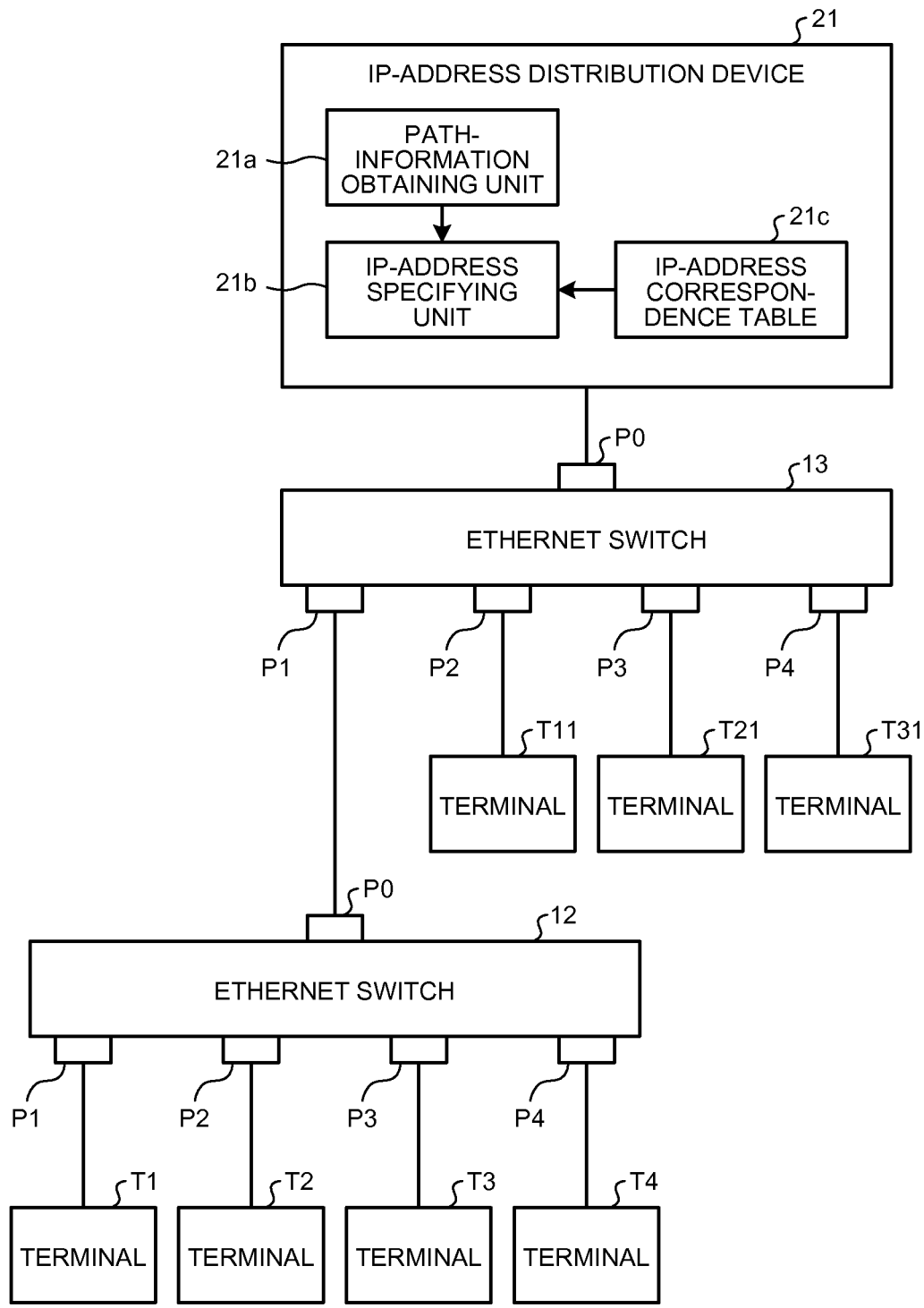
FIG. 4 is a block diagram of a schematic configuration of a system to which an IP-address distribution device 21 according to a second embodiment of the present invention is applied.

FIG. 4 is a block diagram of a schematic configuration of a system to which an IP-address distribution device 21 according to a second embodiment of the present invention is applied. In FIG. 4, the IP-address distribution device 21, the Ethernet switches 12 and 13, and terminals T1 to T4, T11, T21, and T31 are provided on a communication network.

The IP-address distribution device 21 is connected to the terminals T1 to T4 sequentially via the Ethernet switches 13 and 12, and is also connected to the terminals T11, T21, and T31 via the Ethernet switch 13. Ethernet can be used as the communication network, for example.

The IP-address distribution device 21 is connected to a port P0 of the Ethernet switch 13. A port P0 of the Ethernet switch 12 is connected to the port P1 of the Ethernet switch 13. The terminals T11, T21, and T31 are connected to the ports P2 to P4 of the Ethernet switch 13, respectively. The terminals T1 to T4 are connected to the ports P1 to P4 of the Ethernet switch 12, respectively. With this arrangement, a wiring path of a communication network is established. The Ethernet switches 12 and 13 can operate as switching hubs on Ethernet, and can determine which MAC address passes through which one of the ports P0 to P4 of its own Ethernet switches 12 and 13.

A path-information obtaining unit 21a, an IP-address specifying unit 21b, and an IP-address correspondence table 21c are provided in the IP-address distribution device 21. The path-information obtaining unit 21a can obtain path information of the communication network that reaches a request source of an IP address. For example, the path-information obtaining unit 21a can obtain path information of the communication network by inquiring port numbers of the Ethernet switches 12 and 13 that transmit MAC addresses of the request sources of IP addresses. The IP-address specifying unit 21b can specify an IP address to be distributed to the request source of an IP address, based on the path information of the communication network. Correspondence relationships between path information of the communication network and IP addresses can be registered in the IP-address correspondence table 21c.

Figures 5, 6:
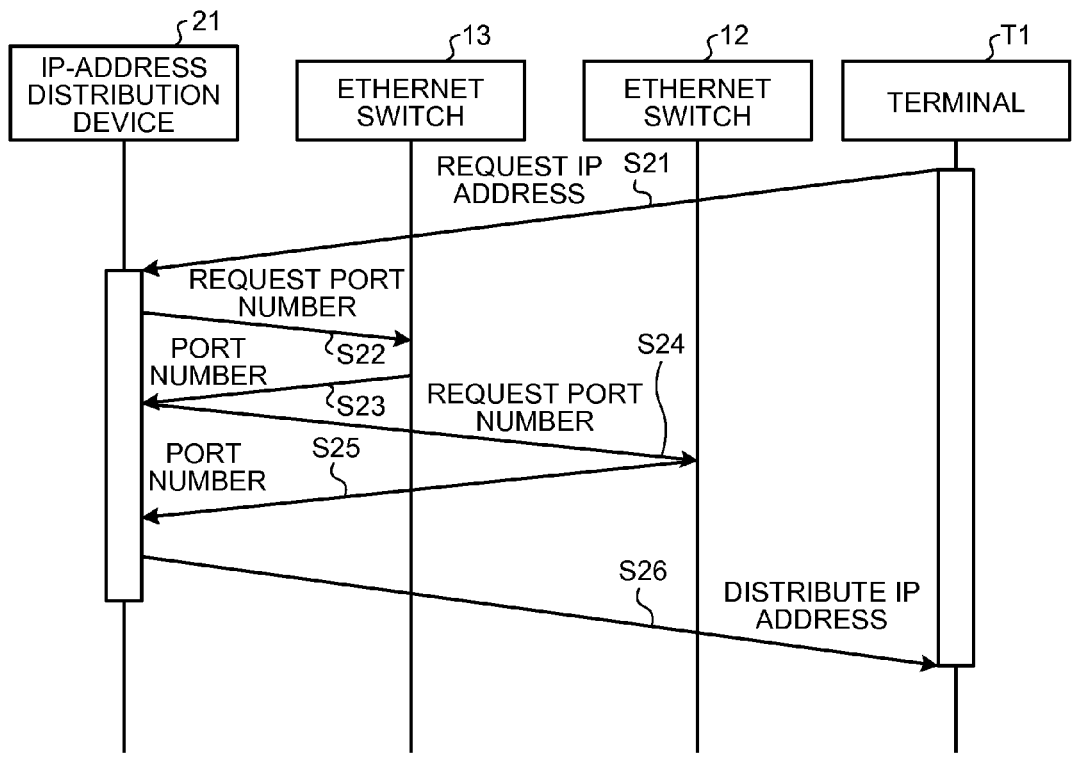
FIG. 5 is an example of contents of an IP-address correspondence table 21c in FIG. 4.
FIG. 6 depicts an operation at the time of distribution of an IP address by the IP-address distribution device 21 in FIG. 4.

FIG. 5 is an example of contents of the IP-address correspondence table 21c in FIG. 4. In FIG. 5, when port numbers of the ports P1 to P4 of the Ethernet switch 12 are 1 to 4, respectively, mutually different IP addresses are registered corresponding to the port numbers 1 to 4 of the ports P1 to P4 of the Ethernet switch 12, in the IP-address correspondence table 21c.

When port numbers of the ports P1 to P4 of the Ethernet switch 13 are 1 to 4, respectively, and also when the Ethernet switch 12 is connected to the port P1 of the Ethernet switch 13, mutually different IP addresses are registered corresponding to the port numbers 2 to 4 of the ports P2 to P4 of the Ethernet switch 13, in the IP-address correspondence table 21c.

An IP address of "192.168.1.1" can be allocated to the terminal T1 that is connected to the port P1 of the Ethernet switch 12, at the request of the terminal T1. An IP address of "192.168.1.2" can be allocated to the terminal T2 connected to the port P2 of the Ethernet switch 12, at the request of the terminal T2. An IP address of "192.168.1.3" can be allocated to the terminal T3 connected to the port P3 of the Ethernet switch 12, at the request of the terminal T3. An IP address of "192.168.1.4" can be allocated to the terminal T4 connected to the port P4 of the Ethernet switch 12, at the request of the terminal T4.

Further, an IP address of "192.168.1.11" can be allocated to the terminal T11 connected to the port P2 of the Ethernet switch 13, at the request of the terminal T11. An IP address of "192.168.1.21" can be allocated to the terminal T21 connected to the port P3 of the Ethernet switch 13, at the request of the terminal T21. An IP address of "192.168.1.31" can be allocated to the terminal T31 connected to the port P4 of the Ethernet switch 13, at the request of the terminal T31.

FIG. 6 depicts an operation at the time of distribution of an IP address by the IP-address distribution device 21 in FIG. 4. In FIG. 6, when there is an IP address request from the terminal T1 in FIG. 4, for example (S21), this IP address request is transmitted to the IP-address distribution device 21 sequentially via the Ethernet switches 12 and 13. In this IP address request, an IP-address request message is transmitted by broadcast. A broadcast address is set in a distribution destination address of this IP-address request message. A MAC address of the terminal T1 is set in a distribution source address.

When the IP-address distribution device 21 receives the IP address request from the terminal T1, the path-information obtaining unit 21a extracts a MAC address from this IP address request. An inquiry about which one of the ports P1 to P4 receives this MAC address is transmitted to the Ethernet switch 13 (S22). The Ethernet switch 13 determines which one of the ports P1 to P4 receives this MAC address. When the port P1 receives the MAC address, the Ethernet switch 13 returns to the IP-address distribution device 21 an indication that the port P1 receives this MAC address (S23).

When the indication that the port P1 receives this MAC address is returned to the IP-address distribution device 21, the IP-address specifying unit 21b refers to the IP-address correspondence table 21c. To specify an IP address in response to the IP address request from the terminal T1, the IP-address distribution device 21 determines it necessary to know through which one of the ports P1 to P4 of the Ethernet switch 12 this MAC address is transmitted.

Therefore, an inquiry about which one of the ports P1 to P4 of the Ethernet switch 12 receives this MAC address is transmitted to the Ethernet switch 12 (S24). The Ethernet switch 12 determines which one of the ports P1 to P4 of the Ethernet switch 12 receives this MAC address.

When the port P1 of the Ethernet switch 12 receives this MAC address, the Ethernet switch 12 returns to the IP-address distribution device 21 an indication that the port P1 of the Ethernet switch 12 receives this MAC address (S25).

When the indication that the port P1 of the Ethernet switch 12 receives this MAC address is returned to the IP-address distribution device 21, the IP-address specifying unit 21b specifies an IP address that corresponds to the port number 1 of the port P1 of the Ethernet switch 12 by referring to the IP-address correspondence table 21c.

When the IP address that corresponds to the port number 1 of the port P1 of the Ethernet switch 12 is specified, this IP address is distributed to the terminal T1 of the request source of an IP address (S26). According to this distribution of an IP address, an IP-address distribution message is transmitted by unicast. A MAC address of the terminal T1 is set in the distribution destination address of this IP-address distribution message, and a MAC address of the IP-address distribution device 21 is set in the distribution source address. When the IP-address distribution device 21 distributes an IP address, information about to which terminal of which MAC address of which port this IP address is distributed is stored.

When the terminal T1 receives the IP address transmitted from the IP-address distribution device 21, this IP address is set as the IP address of the terminal T1. As a result, communications with the terminal T1 become possible by using this IP address.

When the IP-address distribution device 21 receives again an IP address request via the port P1 of the Ethernet switch 12 and the port P1 of the Ethernet switch 13, after the IP address corresponding to the port number 1 of the port P1 of the Ethernet switch 12 is distributed, it is determined whether a MAC address of a distribution source included in the IP address request of this time is the same as a MAC address of a distribution source to which the IP address is already distributed.

When the MAC address of the distribution source included in the IP address request of this time is the same as the MAC address of the distribution source to which the IP address is already distributed, the IP address that is already distributed is distributed to the request source of an IP address of this time. For example, when the terminal T1 requests an IP address again in a state that the terminal T1 is connected to the port P1 of the Ethernet switch 12 after the IP address of "192.168.1.1" is distributed to the terminal T1 in response to the IP address request from the terminal T1, the IP address of "192.168.1.1" is distributed to the terminal T1 again.

On the other hand, when the MAC address of the distribution source included in the IP address request of this time is different from the MAC address of the distribution source to which the IP address is already distributed, the IP address different from the IP address that is already distributed is specified, and this IP address is distributed to the IP address request source of this time. For example, assume that a terminal T5 instead of the terminal T1 is connected to the port P1 of the Ethernet switch 12 after the IP address of "192.168.1.1" is distributed to the terminal T1 in response to the IP address request from the terminal T1. When the terminal T5 requests an IP address via the port P1 of the Ethernet switch 12 and the port P1 of the Ethernet switch 13, an IP address of "192.168.1.5" is distributed to the terminal T5, for example.

With this arrangement, the IP address of "192.168.1.1" can be allocated in a fixed manner to the terminal T1 that is connected to the port P1 of the Ethernet switch 12, even when the Ethernet switches 12 and 13 as plural Ethernet switches are present between the IP-address distribution device 21 and the terminal T1. Therefore, it is possible to prevent allocation of an IP address different from an IP address that is allocated last time to the terminal T1 connected to the port P1 of the Ethernet switch 12. Consequently, the terminal T1 can be efficiently operated on a fixed communication network.

Incidentally, the IP-address distribution device 21 can be used in place of a DHCP server, and the terminals T1 to T4, T11, T21, and T31 can be operated as DHCP clients.

In addition, IP addresses that correspond to a part of the ports P1 to P4 of the Ethernet switch 12 or a part of the ports P1 to P4 of the Ethernet switch 13 can be registered in the IP-address correspondence table 21c, and protocols of a DHCP or the like can be used for the rest of the ports P1 to P4.

Third Embodiment

Figure 7:
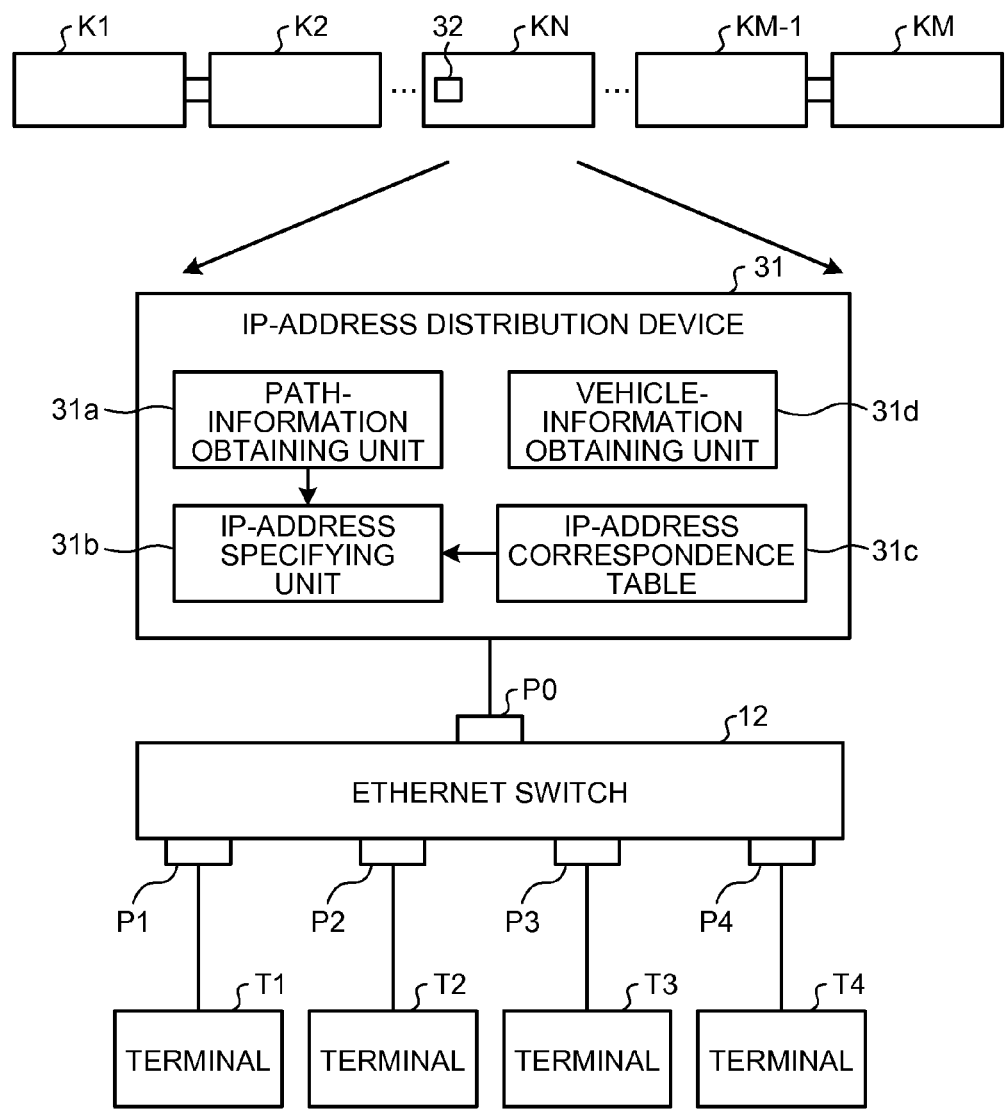
FIG. 7 is a block diagram of a schematic configuration of a system to which an IP-address distribution device 31 according to a third embodiment of the present invention is applied.

FIG. 7 is a block diagram of a schematic configuration of a system to which an IP-address distribution device 31 according to a third embodiment of the present invention is applied. In FIG. 7, vehicles K1 to KM (M is an integer equal to or larger than 1) are provided in a formation of a train. A vehicle-information managing unit 32 is provided in an N-th (N is an integer equal to or larger than 1 and equal to or smaller than M) vehicle KN. The vehicle-information managing unit 32 can manage vehicle information for specifying positions of the vehicles K1 to KM in the train formation.

The IP-address distribution device 31, the Ethernet switch 12, and the terminals T1 to T4 are provided on a communication network having been established in an N-th vehicle KN. The IP-address distribution device 31 is connected to the terminals T1 to T4 via the Ethernet switch 12. Ethernet can be used as the communication network, for example. A device that works based on a command signal from the outside for operating the vehicle KN, such as a door opening/closing device, a brake device, an illumination device or an airconditioning device, for example, can be used for the terminals T1 to T4 on the vehicle KN.

In this case, the IP-address distribution device 31 is connected to a port P0 of the Ethernet switch 12, and the terminals T1 to T4 are connected to the ports P1 to P4 of the Ethernet switch 12, respectively, thereby establishing a wiring path of the communication network.

A path-information obtaining unit 31a, an IP-address specifying unit 31b, an IP-address correspondence table 31c, and a vehicle-information obtaining unit 31d are provided in the IP-address distribution device 31. The path-information obtaining unit 31a can obtain path information of the communication network that reaches a request source of an IP address. For example, the path-information obtaining unit 31a can obtain path information of the communication network by inquiring a port number of the Ethernet switch 12 that transmits a MAC address of the request source of an IP address. The vehicle-information obtaining unit 31d can obtain vehicle information for specifying a position of a vehicle in the train formation in which the communication network is established. The IP-address specifying unit 31b can specify an IP address to be distributed to the request source of an IP address, based on path information of the communication network and the vehicle information. Correspondence relationships between the path information of the communication network and IP addresses that are determined corresponding to a position of a vehicle can be registered in the IP-address correspondence table 31c.

FIG. 8 is an example of contents of the IP-address correspondence table 31c in FIG. 7. In FIG. 8, assume that the IP-address distribution device 31 is arranged in the N-th vehicle KN and that port numbers of the ports P1 to P4 of the Ethernet switch 12 are 1 to 4, respectively. In this case, mutually different IP addresses are registered corresponding to a number N of the vehicle KN and the port numbers 1 to 4, respectively, in the IP-address correspondence table 31c.

In the vehicle KN, an IP address of "192.168.N.1" can be allocated to the terminal T1 connected to the port P1 of the port number 1, at the request of the terminal T1. In the vehicle KN, an IP address of "192.168.N.2" can be allocated to the terminal T2 connected to the port P2 of the port number 2, at the request of the terminal T2. In the vehicle KN, an IP address of "192.168.N.3" can be allocated to the terminal T3 connected to the port P3 of the port number 3, at the request of the terminal T3. In the vehicle KN, an IP address of "192.168.N.4" can be allocated to the terminal T4 connected to the port P4 of the port number 4, at the request of the terminal T4.

FIG. 9 depicts an operation at the time of distribution of an IP address by the IP-address distribution device 31 in FIG. 7. In FIG. 9, when the vehicle-information managing unit 32 in FIG. 7 transmits vehicle information to the vehicle-information obtaining unit 31d, IP addresses that correspond to the vehicle information are registered in the IP-address correspondence table 31c for the port numbers 1 to 4, respectively. For example, when the IP-address distribution device 31 distributes IP addresses to the communication network of the vehicle KN, IP addresses that correspond to the number N of the vehicle KN are registered in the IP-address correspondence table 31c for the port numbers 1 to 4, respectively (S30).

When there is an IP address request from the terminal T1 in FIG. 7 (S31), the IP address request is transmitted to the IP-address distribution device 31 via the Ethernet switch 12. In this IP address request, an IP-address request message is transmitted by broadcast. A broadcast address is set in a distribution destination address of this IP-address request message. A MAC address of the terminal T1 is set in a distribution source address.

When the IP-address distribution device 31 receives the IP address request from the terminal T1, the path-information obtaining unit 31a extracts a MAC address from this IP address request. An inquiry about which one of the ports P1 to P4 receives this MAC address is transmitted to the Ethernet switch 12 (S32). The Ethernet switch 12 determines which one of the ports P1 to P4 receives this MAC address. When the port P1 receives the MAC address, the Ethernet switch 12 returns to the IP-address distribution device 31 an indication that the port P1 receives this MAC address (S33).

When the indication that the port P1 receives this MAC address is returned to the IP-address distribution device 31, the IP-address specifying unit 31b specifies an IP address that corresponds to the number N of the vehicle KN and the port number 1 of the port P1, by referring to the IP-address correspondence table 31c.

When the IP address that corresponds to the number N of the vehicle KN and the port number 1 of the port P1 is specified, this IP address is distributed to the terminal T1 of the request source of the IP address (S34). According to this distribution of an IP address, an IP-address distribution message is transmitted by unicast. A MAC address of the terminal T1 is set in the distribution destination address of this IP-address distribution message, and a MAC address of the IP-address distribution device 31 is set in the distribution source address. When the IP-address distribution device 31 distributes an IP address, information about to which terminal of which MAC address of which port this IP address is distributed is stored.

When the terminal T1 receives the IP address transmitted from the IP-address distribution device 31, this IP address is set as the IP address of the terminal T1. As a result, communications with the terminal T1 become possible by using this IP address.

When the IP-address distribution device 31 receives again an IP address request via the port P1 of the Ethernet switch 12 after the IP address corresponding to the port number 1 of the port P1 is distributed, it is determined whether a MAC address of a distribution source included in the IP address request of this time is the same as a MAC address of a distribution source to which the IP address is already distributed.

When the MAC address of the distribution source included in the IP address request of this time is the same as the MAC address of the distribution source to which the IP address is already distributed, the IP address that is already distributed is distributed to the request source of an IP address of this time. For example, when the terminal T1 requests an IP address again in a state that the terminal T1 is connected to the port P1 of the Ethernet switch 12 after the IP address of "192.168.N.1" is distributed to the terminal T1 in response to the IP address request from the terminal T1, the IP address of "192.168.N.1" is distributed to the terminal T1 again.

On the other hand, when the MAC address of the distribution source included in the IP address request of this time is different from the MAC address of the distribution source to which the IP address is already distributed, the IP address different from the IP address that is already distributed is specified, and this IP address is distributed to the IP address request source of this time. For example, assume that a terminal T5 instead of the terminal T1 is connected to the port P1 of the Ethernet switch 12 after the IP address of "192.168.N.1" is distributed to the terminal T1 in response to the IP address request from the terminal T1. When the terminal T5 requests an IP address via the port P1 of the Ethernet switch 12, an IP address of "192.168.N.5" is distributed to the terminal T5, for example.

With this arrangement, the IP address of "192.168.N.1" can be allocated to the terminal T1 that is connected to the port P1 of the Ethernet switch 12 in a fixed manner. Therefore, it is possible to prevent allocation of an IP address different from an IP address that is allocated last time to the terminal T1 connected to the port P1 of the Ethernet switch 12. Consequently, a function of the terminal T1 to which the IP address of "192.168.N.1" is allocated can be specified. Therefore, it is sufficient that only a specific command signal that corresponds to the function of the terminal T1 is given to the IP address of "192.168.N.1", and it is not necessary to give all command signals to the IP address. As a result, the load applied on the terminal T1 can be reduced.

By allocating IP addresses to the terminals T1 to T4 in a fixed manner, even when a fault occurs in the vehicle KN, it becomes easy to determine a fault position. The IP-address distribution device 31 can be used in place of a DHCP server, and the terminals T1 to T4 can be operated as DHCP clients.

IP addresses that correspond to a part of the ports P1 to P4 of the Ethernet switch 12 can be registered in the IP-address correspondence table 31c, and protocols of DHCP or the like can be used for the rest of the ports P1 to P4.

Fourth Embodiment

FIG. 10 is a block diagram of a schematic configuration of a system to which an IP-address distribution device 41 according to a third embodiment of the present invention is applied. In FIG. 10, the IP-address distribution device 41, the Ethernet switch 12, and the terminals T1 to T4 are provided on a communication network. The IP-address distribution device 41 is connected to the terminals T1 to T4 via the Ethernet switch 12. Incidentally, Ethernet can be used for the communication network.

The IP-address distribution device 41 is connected to a port P0 of the Ethernet switch 12, and the terminals T1 to T4 are connected to the ports P1 to P4 of the Ethernet switch 12, respectively, thereby establishing a wiring path of the communication network.

A path blocking unit 41a, an IP-address specifying unit 41b, and an IP-address correspondence table 41c are provided in the IP-address distribution device 41. The path blocking unit 41a can block other paths such that only a path of a communication network that reaches a request source of an IP address is validated. The IP-address specifying unit 41b can specify an IP address to be distributed to the request source of an IP address, based on path information of the communication network that has been validated by the path blocking unit 41a. Correspondence relationships between path information of the communication network and IP addresses can be registered in the IP-address correspondence table 41c. Contents identical to those in the IP-address correspondence table 11c in FIG. 2 can be registered in the IP-address correspondence table 41c.

Figure 11:
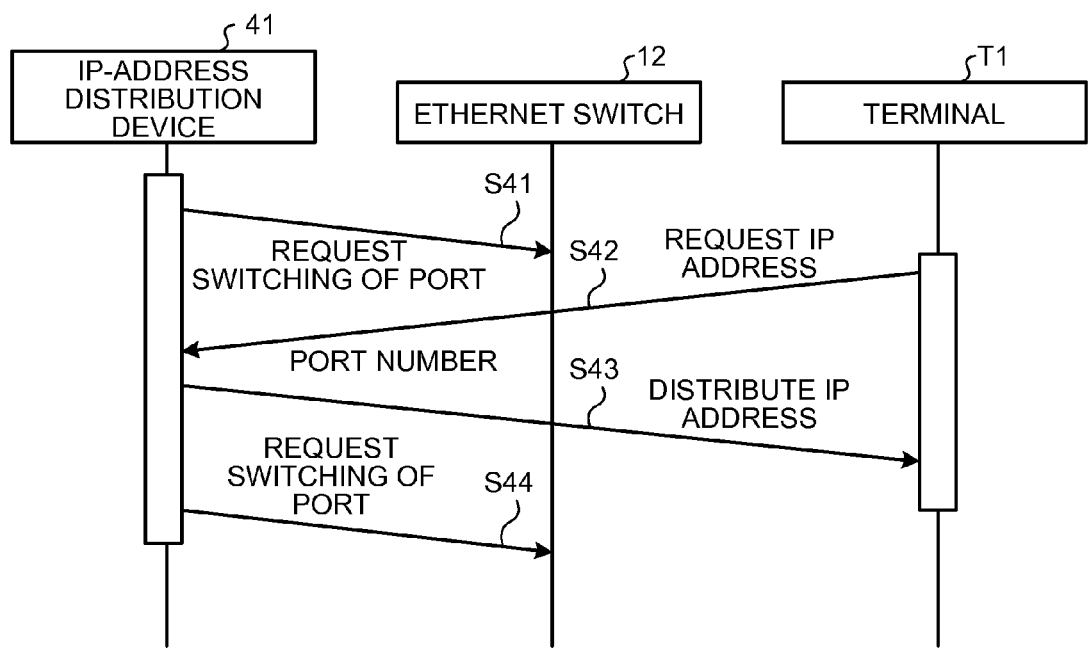
FIG. 11 depicts an operation at the time of distribution of an IP address by the IP-address distribution device 41 in FIG. 10.

FIG. 11 depicts an operation at the time of distribution of an IP address by the IP-address distribution device 41 in FIG. 10. In FIG. 11, assume that IP addresses that correspond to the ports P1 to P4 of the Ethernet switch 12, respectively, are registered in the IP-address correspondence table 41c, as shown in FIG. 2. The path blocking unit 41a instructs the Ethernet switch 12 to sequentially validate communications such that only one of the ports P1 to P4 can communicate (S41, S44). For example, at S41, communication paths of the ports P2 to P4 can be blocked such that communications of only the port P1 of the Ethernet switch 12 are validated; at S44, communication paths of the ports P1, P3, and P4 can be blocked such that communications of only the port P2 of the Ethernet switch 12 are validated. The path blocking unit 41a can periodically repeat blocking such that communications of only one of the ports P1 to P4 of the Ethernet switch 12 are sequentially validated.

On the other hand, when the terminal T1 requests an IP address, the IP address request is periodically transmitted from the terminal T1. In this IP address request, an IP-address request message is transmitted by broadcast. A broadcast address is set in a distribution destination address of this IP-address request message, and a MAC address of the terminal T1 is set in a distribution source address.

When the terminal T1 requests an IP address when communications of only the port P1 of the Ethernet switch 12 are validated, this IP address request is transmitted to the IP-address distribution device 41 via the Ethernet switch 12 (S42).

When the IP-address distribution device 41 receives the IP address request from the terminal T1, the IP-address specifying unit 41b specifies an IP address that corresponds to the port number 1 of the port P1, by referring to the IP-address correspondence table 41c.

When the IP address that corresponds to the port number 1 of the port P1 is specified, this IP address is distributed to the terminal T1 of the request source of the IP address (S43). According to this distribution of an IP address, an IP-address distribution message is transmitted by unicast. A MAC address of the terminal T1 is set in the distribution destination address of this IP-address distribution message, and a MAC address of the IP-address distribution device 41 is set in the distribution source address. When the IP-address distribution device 41 distributes an IP address, information about to which terminal of which MAC address of which port this IP address is distributed is stored.

When the terminal T1 receives the IP address transmitted from the IP-address distribution device 41, this IP address is set as the IP address of the terminal T1. As a result, communications with the terminal T1 become possible by using this IP address.

When the IP-address distribution device 41 receives again an IP address request via the port P1 of the Ethernet switch 12 after the IP address corresponding to the port number 1 of the port P1 is distributed, it is determined whether a MAC address of a distribution source included in the IP address request of this time is the same as a MAC address of a distribution source to which the IP address is already distributed.

When the MAC address of the distribution source included in the IP address request of this time is the same as the MAC address of the distribution source to which the IP address is already distributed, the IP address that is already distributed is distributed to the request source of an IP address of this time. For example, when the terminal T1 requests an IP address again in a state that the terminal T1 is connected to the port P1 of the Ethernet switch 12 after the IP address of "192.168.1.1" is distributed to the terminal T1 in response to the IP address request from the terminal T1, the IP address of "192.168.1.1" is distributed to the terminal T1 again.

On the other hand, when the MAC address of the distribution source included in the IP address request of this time is different from the MAC address of the distribution source to which the IP address is already distributed, the IP address different from the IP address that is already distributed is specified, and this IP address is distributed to the IP address request source of this time. For example, assume that a terminal T5 instead of the terminal T1 is connected to the port P1 of the Ethernet switch 12 after the IP address of "192.168.1.1" is distributed to the terminal T1 in response to the IP address request from the terminal T1. When the terminal T5 requests an IP address via the port P1 of the Ethernet switch 12, an IP address of "192.168.1.5" is distributed to the terminal T5, for example.

With this arrangement, the IP address of "192.168.1.1" can be allocated to the terminal T1 without inquiring the Ethernet switch 12 for path information even when the IP address that is allocated to the terminal T1 is set again after the IP address of "192.168.1.1" is allocated to the terminal T1, which is connected to the port P1 of the Ethernet switch 12. Therefore, it is possible to prevent allocation of an IP address different from an IP address that is allocated last time to the terminal T1 connected to the port P1 of the Ethernet switch 12. Consequently, the terminal T1 can be efficiently operated on a fixed communication network.

The IP-address distribution device 41 can be used in place of a DHCP server, and the terminals T1 to T4 can be operated as DHCP clients.

IP addresses that correspond to a part of the ports P1 to P4 of the Ethernet switch 12 can be registered in the IP-address correspondence table 41c, and protocols of DHCP or the like can be used for the rest of the ports P1 to P4.

In the fourth embodiment shown in FIG. 10, a method of using the IP-address distribution device 41 has been explained in place of the IP-address distribution device 11 shown in FIG. 1. Alternatively, the IP-address distribution device 41 can be used in place of the IP-address distribution device 21 in FIG. 4, and the IP-address distribution device 41 can be used in place of the IP-address distribution device 31 in FIG. 7.

INDUSTRIAL APPLICABILITY

As explained above, the IP-address distribution device according to the present invention can distribute an IP address by relating the IP address to a physical wiring path on a network, and is suitable for a method for allocating the same IP address to a terminal that is connected again to the same position on a communication network.

REFERENCE SIGNS LIST 11, 21, 31, 41 IP-ADDRESS DISTRIBUTION DEVICE
11a, 21a, 31a PATH-INFORMATION OBTAINING UNIT
11b, 21b, 31b, 41b IP-ADDRESS SPECIFYING UNIT
11c, 21c, 31c, 41c IP-ADDRESS CORRESPONDENCE TABLE
12, 13 ETHERNET SWITCH
P1 to P5 PORT
T1 to T4, T11, T21, T31 TERMINAL
31d VEHICLE-INFORMATION OBTAINING UNIT
32 VEHICLE-INFORMATION MANAGING UNIT
41a PATH BLOCKING UNIT
K1 to KM VEHICLE

The invention claimed is:
1. An IP-address distribution device comprising:
a path-information obtaining unit that obtains a piece of path information indicating a physical connection configuration of a communication network that reaches a terminal as a request source of an IP address; and
an IP-address specifying unit that specifies an IP address to be distributed to the request source based on a piece of path information of the communication network; and an IP-address correspondence table in which correspondence relationships between pieces of path information of the communication network and IP addresses are registered, wherein
the path-information obtaining unit obtains the path information by inquiring a port number of an Ethernet switch that has transmitted a MAC address of the request source, and
the IP-address specifying unit, when specifying an IP address corresponding to the path information of the communication network based on a result of referring to the IP-address correspondence table, specifies and distributes a second IP address as a response to an IP address request from a second terminal, wherein
the second IP address is different from a first IP address of a first terminal to which the first IP address is already distributed, the first terminal having been connected to the IP-address distribution device via a specific path,
the second terminal is connected to the specific path with respect to a path from the second terminal to the IP-address distribution device, and
the second terminal has a MAC address different from a MAC address of the first terminal to which the first IP address is already distributed.

2. An IP-address distribution device comprising:
a path-information obtaining unit that obtains a piece of path information of a communication network that reaches a request source of an IP address;
a vehicle-information obtaining unit that obtains vehicle information for specifying a position of a vehicle in a formation of a train in which the communication network is established;
an IP-address specifying unit that specifies an IP address to be distributed to the request source based on a piece of path information of the communication network and vehicle information; and
an IP-address correspondence table in which correspondence relationships between pieces of path information of the communication network and IP addresses that are determined corresponding to a position of the vehicle are registered, wherein
the IP-address specifying unit, when specifying an IP address corresponding to the path information of the communication network and a position of the vehicle based on a result of referring to the IP-address correspondence table, specifies and distributes a second IP address as a response to an IP address request from a second terminal, wherein
the second IP address is different from a first IP address of a first terminal to which the first IP address is already distributed, the first terminal having been connected to the IP-address distribution device via a specific path,
the second terminal is connected to the specific path with respect to a path from the second terminal to the IP-address distribution device, and
the second terminal has a MAC address different from a MAC address of the first terminal to which the first IP address is already distributed.

3. An IP-address distribution method comprising:
a step in which a piece of path information of a communication network, the path information indicating a physical connection configuration, that reaches a terminal as a request source of an IP address from an IP-address distribution device is obtained by inquiring a port number of an Ethernet switch that transmits a MAC address of the request source of the IP address; and
a step in which an IP address that corresponds to the piece of path information of the communication network is specified based on a result of referring to an IP-address correspondence table, in which correspondence relationships between pieces of path information of the communication network and IP addresses are registered, wherein
in the step of specifying the IP address, a second IP address is specified and distributed as a response to an IP address request from a second terminal,
the second IP address is different from a first IP address of a first terminal to which the first IP address is already distributed, the first terminal having been connected to the IP-address distribution device via a specific path,
the second terminal is connected to the specific path with respect to a path from the second terminal to the IP-address distribution device, and
the second terminal has a MAC address different from a MAC address of the first terminal to which the first IP address is already distributed.

4. An IP-address distribution method comprising:
a step in which a piece of path information of a communication network that reaches a request source of an IP address from an IP-address distribution device is obtained;
a step in which a position of a vehicle in a formation of a train in which the communication network is established is specified; and
a step in which an IP address that corresponds to the piece of path information of the communication network and a position of the vehicle is specified based on a result of referring to an IP-address correspondence table, in which correspondence relationships between pieces of path information of the communication network and IP addresses that are determined corresponding to the position of the vehicle are registered, wherein
in the step of specifying the IP address, a second IP address is specified and distributed as a response to an IP address request from a second terminal,
the second IP address is different from a first IP address of a first terminal to which the first IP address is already distributed, the first terminal having been connected to the IP-address distribution device via a specific path,
the second terminal is connected to the specific path with respect to a path from the second terminal to the IP-address distribution device, and
the second terminal has a MAC address different from a MAC address of the first terminal to which the first IP address is already distributed.

* * * * *